H. DAVISON.
CAR FENDER.
APPLICATION FILED JULY 23, 1920.

1,375,446.

Patented Apr. 19, 1921.

Inventor
Hugh Davison
By his Attorney
Eugene Pearl

UNITED STATES PATENT OFFICE.

HUGH DAVISON, OF NEW YORK, N. Y.

CAR-FENDER.

1,375,446.  Specification of Letters Patent.  Patented Apr. 19, 1921.

Application filed July 23, 1920. Serial No. 398,423.

*To all whom it may concern:*

Be it known that I, HUGH DAVISON, a citizen of the United States, residing in New York, in the county of New York and State of New York, have invented certain new and useful Improvements in Car-Fenders, of which the following is a specification.

The principal purpose of this invention is to provide a fender engageable with a vehicle, as an automobile, and adapted to prevent serious injury being done an individual struck by same.

A further object is to provide an elastic device in front of the fender adapted to precipitate a person in the path of the vehicle, when contact is made, upon a raised platform, contact with which releases the front elements of the fender, permitting them to rise so as to partially inclose the person and carry the same safely until liberated, avoiding the possibility of the vehicle passing over the body.

These and other objects, which will become apparent as the description progresses, are attained by the novel construction, combination and arrangement of parts hereinafter described and shown in the annexed drawings, forming a material part of this disclosure, and in which:—

Figure 1:
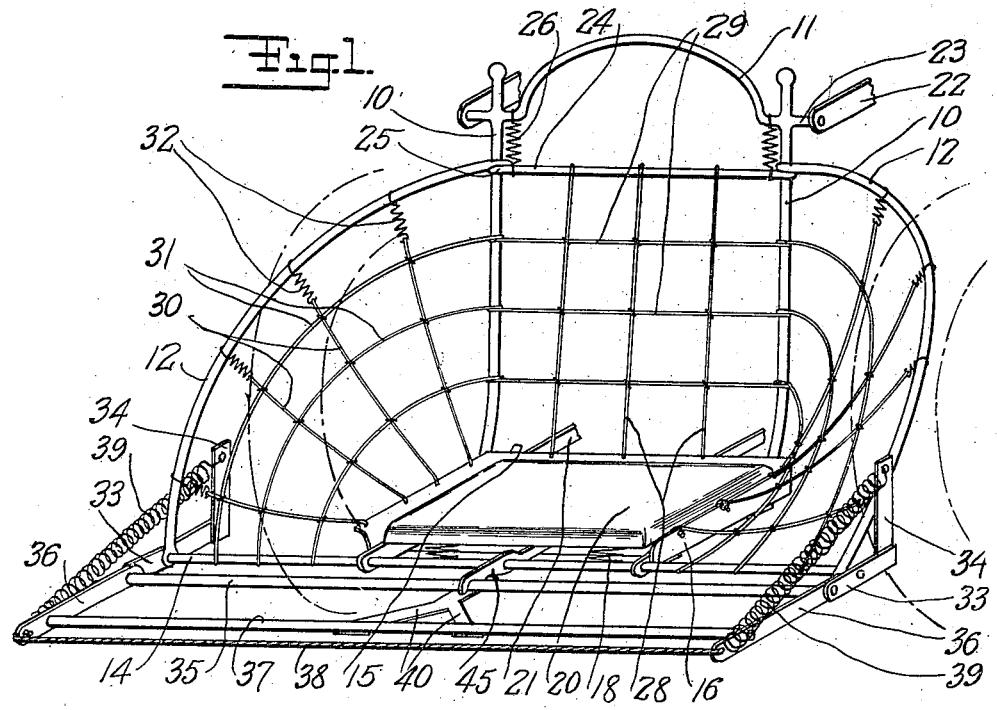
Figure 1 is a perspective view of a fender made in accordance with the invention.
Figure 2:
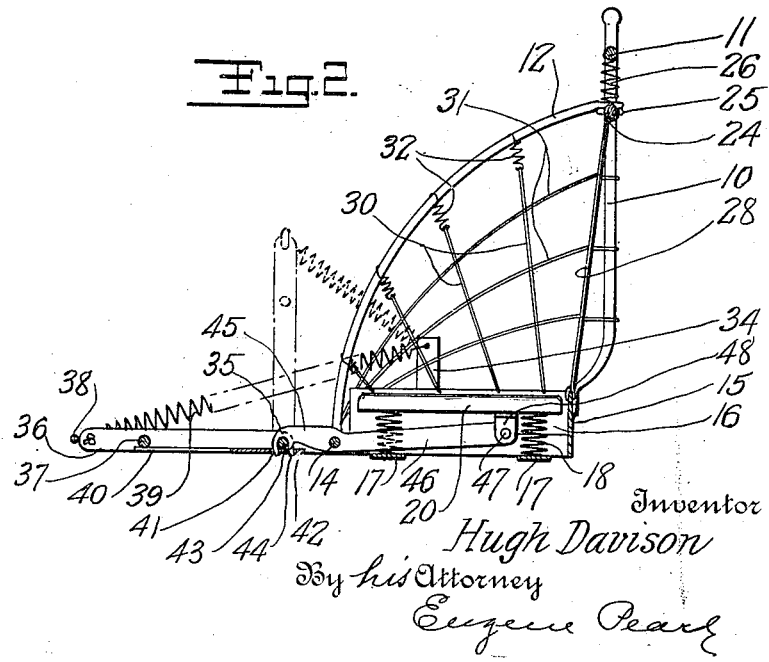
Fig. 2 is a fragmentary sectional view, taken on the center of the fender and showing the trip release mechanism.

Referring to the drawings in detail, a frame, comprised of a pair of uprights 10 connected by an arched yoke 11, has rigidly connected on each side arms 12, bowed outward toward the front and laterally to the side edges, where they are engaged with a rod 14 extending the entire length of the fender.

Secured to the lower ends of the frame elements 10 is the upper edge of a plate 15 bent at each of its ends, which extend forward at right angles forming the sides 16 of a frame and fastened to their lower edges are a pair of transverse strips 17 supporting coiled compression springs 18 carrying a platform 20, the functions of which will be described farther on.

Extending rearwardly from the frame element 15, is a pair of bars 21 adapted to be secured to some portion of the vehicle, as the axle, while similar bars 22 extend rearwardly from projections 23 of the frame standards 10, for like attaching purposes.

A transverse bar 24 is provided with eyes 25 slidably encircling the uprights 10 and is held in a normally raised position by coiled pull springs 26 attached respectively to the bar 24 and the ends of the yoke 11.

Extending between the horizontal bar 24 and the edge of the frame plate 15 are a plurality of cords or wires 28 crossed by similar elements 29 secured to the uprights 10 and forming a flexible netted backing at the rear of the platform 20.

A similar plurality of cords or wires 30 extend between the arms 12 and side elements 16 of the seat frame, the same being interlaced with similar elements 31 extending between the rod 14 and uprights 10 and in order to provide a suitable resiliency in the structure, tension springs 32 are interposed between the arms 12 and upper ends of the elements 30, forming in effect and appearance a portion of a basket.

Attached to the outer ends of the rod 14 are strips 33 having extending ends engaging a pair of vertical arms 34 at the rear and supporting a horizontal rod 35 at their front ends.

Pivoted on the rod 35 adjacent the strips 33, are a pair of flat bars 36 having between them a stretcher rod 37, and carried at their outer extremities is a stressed cord or cable 38, the same extending entirely across the path of the vehicle, relatively close to the ground and adapted to make tripping contact with a pedestrian should one be in its way.

Helically wound tension springs 39 are also attached to the ends of the bars 36, the springs extending rearward and upward to the tops of arms 34 fixed on the elements 33 thus exerting a pull adapted to draw the cable 38 upward in front of the platfrom 20.

The cable 38 is held extended horizontally in the following manner. A Y shaped plate 40 is secured below the rods 37 and 35, and is provided with two holes 41 and 42 receivable of fork elements 43 and 44, the same straddling the rod 35, upon which the bars 36 pivot, and are formed at the outer end of a lever 45, pivoted on the rod 14, its longer rear end 46 being pivoted by a pin 47 in a bracket 48 attached to the lower side of the platform 20 in the manner of a hinge.

When the seat is depressed, as by a person falling upon it, the lever 45 is actuated, causing the forks to rise and in turn free the plate 40, which turns vertically upward, due to the pull of the springs 39 and confines the person upon the platform out of danger from ground contact, or of the vehicle wheels (shown in dotted lines in Fig. 1.) and who will be carried safely by the car until released, whereupon the platform may be reset in the manner of a trap.

From the foregoing it will be seen that the fender disclosed is readily attachable to any ordinary form of vehicle of the self-propelled type, and that by its use accidents arising from impact with a vehicle may be avoided.

It will also be evident that the operation of the fender is entirely automatic and consequent upon impact with a body without volition on part of the car operator.

Having thus described my invention and set forth the manner of its construction, operation and use, what I claim as new and desire to secure by Letters Patent, is:—

1. A vehicle fender comprising a substantially convex frame, yielding interlaced elements secured to said frame, a spring supported receiving platform carried by the frame, a webbed backing at the rear of said platform, means for resiliently supporting said backing, a folding trip pivoted to the frame, a lever operated by said platform, a plate fixed to said trip, said plate having an opening at each side of the axis of said trip, a fork formed with said lever adapted to engage in the mentioned openings, and means for raising said fork upon depression of said platform.

2. A vehicle fender comprising, in combination with a convex frame having resiliently supported nettings disposed thereover, a spring supported platform central of said frame, a hingedly engaged trip, springs adapted to raise said trip into a vertical position in front of said platform, means for normally holding said trip horizontal, and means actuated by the descent of said platform for releasing said trip holding means.

3. A vehicle fender comprising a vertical frame, semi-convex wings engaged therewith, a platform in front of said frame, a spring supported elastic backing for said platform in said frame, means for resiliently supporting said platform, a normally horizontal trip pivotally engaged with said frame at the front thereof, means for actuating said trip upon its pivots, a plate below said trip having openings on each side of the axis of its pivots, a two pronged fork engageable in the mentioned openings over the axis, and means for raising said fork coincident upon depression of said platform whereby the trip is permitted to rise.

4. A vehicle fender comprising a vertical frame, semi-convex wings engaged therewith, a platform in front of said frame, means for resiliently supporting said platform, a normally horizontal trip pivotally engaged with said frame at the front thereof, means for actuating said trip upon its pivots, a plate below said trip having openings on each side of the axis of the pivots, a lever pivoted rearward of the axis, lateral prongs formed with said lever adapted to engage with said plate, and means on said plate for operating said lever upon contact therewith, releasing said trip.

In testimony whereof I have signed my name to this application.

HUGH DAVISON.